United States Patent Office 2,736,680
Patented Feb. 28, 1956

2,736,680

LAMINATION OF FLUOROCARBONS SUCH AS POLYTRIFLUOROCHLOROETHYLENE WITH OTHER MATERIALS

Alfred S. Kidwell, Milford, Conn., assignor to The Connecticut Hard Rubber Company, New Haven, Conn., a corporation of Connecticut No Drawing. Application April 7, 1953,
Serial No. 347,405

7 Claims. (Cl. 154—139)

This invention relates to the lamination of fluorocarbons such as polytrifluorochloroethylene with other materials.

In an application of A. Panagrossi and R. L. Hauser, filed November 3, 1952, Serial No. 318,442, now abandoned, there is described a procedure for laminating fluorocarbons such as polytrifluorochloroethylene or polytetrafluoroethylene with another material such as metal, in which procedure the sheet or piece of high-molecular-weight resin is cemented through the use of a priming composition applied to the sheet or piece and containing fine particles of the resin and fine particles of rubber. In that procedure it is necessary in adhesively applying the layer of resinous material to the other layer to use heat and strong pressure in order to cure the elastomer and form a tight bond between the layers.

An object of the present invention is to facilitate the laminating process particularly in the direction of dispensing with the need for high-temperature treatment in applying one member of the laminate to the other. More especially an object is to provide a process in which this step can be carried out at room temperature and without exerting heavy pressure. According to the procedure of the present invention, the process is so simplified as to enable laminates to be made in the field by the use of simple and easily portable equipment.

As will appear from the following description, the procedure in accordance with this invention involves the bonding of a piece or sheet of high-molecular-weight fluorocarbon polymer to another material by a process which comprises forming an intimate mixture of finely divided fluorocarbon polymer and finely divided polyalkylene polysulfide rubber on a surface of the sheet, fusing it thereon to provide on the sheet a composite priming coating, and then adhesively securing the sheet to another material by the use of a cement applied to the other material and to said priming coating and containing uncured polyalkylene polysulfide rubber, and letting the resulting assembly stand for about 24 hours at room temperature to accomplish the curing of the rubber in the cement.

In practicing the process, the primer can be prepared advantageously by the use of a liquid polysulfide synthetic rubber mixed with a suitable filler such as titanium dioxide, and in some cases a curing agent or catalyst such as lead dioxide. The polysulfide synthetic rubber referred to is found on the market under the trade name "Thiokol." It is sometimes referred to as the reaction product of alkylene dihalides and alkali metal polysulfides and is defined as a polyalkylene polysulfide having reactive mercaptan terminals and side groups capable of further polymerization and cross linkage. There are at least two polymers under the name "Thiokol" which are available and suitable. One of these is "LP-2," which is an amber liquid having a specific gravity of 1.27, a molecular weight of approximately 4,000, and a viscosity at 80° F. of 450 poises. Another is "LP-3," and this is similar to "LP-2" but has a lower molecular weight (approximately 1,000) and a viscosity at 80° F. of 10 poises.

The procedure in making a laminate by the present invention will be made clear by the following examples, in which ingredient measurements are by weight:

Example 1

A cementing compound was prepared having the following ingredients:

| | Parts |
|---|---|
| "Thiokol" LP-2 | 100 |
| Titanium dioxide | 100 |
| Lead dioxide | 7.5 |

60 parts of this liquid compound was mixed with 40 parts of polytrifluorochloroethylene ("Kel-F") solids in the form of a dispersion containing about 20% solids in xylene. This mixture including fine particles of the resin and fine particles of the elastomer was stirred until it was homogeneous, and then brushed out as a smooth coating on the surface of a sheet of "Kel-F" film. The film, primer side up, was then placed on a sheet of aluminum in an oven at a temperature of 480° F., and after 12 minutes was taken out and allowed to cool. On cooling, the surface coating was found to be tightly fused to the "Kel-F" sheet so as to form a priming adhesive coating.

The next step was to apply a thin coating of the same cementing compound above mentioned to one face of a sheet of aluminum, and then apply to the cement-coated face of the aluminum sheet the primed surface of the "Kel-F" sheet. The "Kel-F" sheet was pressed tightly onto the aluminum sheet using a small hand roller for applying the pressure. The laminate was then allowed to stand 24 hours at room temperature so as to accomplish the curing of the interposed cement which cures without the application of heat. The two parts of the laminate were found to be very strongly bonded together, as a peel test made on a strip of the laminate 1 inch wide by 6 inches long showed an average bond strength of 5.0 lbs. per inch width.

Example 2

The procedure was generally similar to that of Example 1, but the compound containing "Thiokol" LP-2 contained no curing agent or catalyst, and was made of equal parts of "Thiokol" LP-2 and titanium dioxide. 40 parts of this "Thiokol" compound were mixed with 60 parts of "Kel-F" solids to provide a priming mixture. The priming mixture was fused to the "Kel-F" sheet by applying a temperature at 450° F. for 5 minutes.

In forming the laminate, the same "Thiokol" compound as above mentioned was used as a cement with catalyst added as in Example 1. After assembling the laminate and pressing the parts together with light pressure and allowing the laminate to stand 24 hours at room temperature, a test strip showed a bond strength of 3.5 lbs. per inch of width.

Example 3

In this case a different "Thiokol" LP-2 compound was used having the following ingredients:

| | Parts |
|---|---|
| "Thiokol" LP-2 | 100 |
| Fine carbon black | 60 |

The primer was prepared with 60 parts of this compound and 40 parts of "Kel-F" solids. The priming composition was applied to the "Kel-F" lamina as in Example 1, and fused at 450° F. for 15 minutes. The same composition containing the polysulfide rubber and the carbon black plus 7.5 parts of lead dioxide was then applied to a metal sheet and the primed surface of the "Kel-F" sheet applied and adhered to the cement-coated surface of the metal sheet, and the laminate left to stand for 24 hours at room temperature to accomplish curing of the cement. A test strip of the laminate showed a bond strength of 8 lbs. per inch of width.

Example 4

In order to line a can made of aluminum with a complete "Kel-F" liner or coating, the procedure was as follows:

A liner of "Kel-F" was made in two or more pieces so as to fit the can interior. The "Kel-F" sheet was primed by applying to the surfaces which would be opposed to the can surfaces a priming mixture made up as described in Example 2, for instance, and then cut into peices of appropriate size and shape. The can then had applied to its inner surface a "Thiokol" cement having the same composition as the cement in the priming mixture plus curing agent (lead dioxide). The "Kel-F" material was then pressed into place in the can against the cement on the interior of the can, and the cement cured by being allowed to stand at room temperature for about 24 hours. The joints in the "Kel-F" lining were sealed together by the application of heat. It was found that the resulting "Kel-F" lining was tightly bonded to the walls of the can.

Example 5

The procedure in this instance was the same as in Example 4, except for the fact that the receptacle was a glass jar. In this case also the "Kel-F" lining was tightly bonded to the wall of the jar.

A cement or adhesive containing "Thiokol" and curing agent, as above described, has the advantage that it is self-curing on exposure to air and that a heating temperature substantially above room temperature is not required. Where the adhesive compound contains lead dioxide as a curing agent, the compound must be used immediately after mixing, as it is subject to rapid curing. An advantage of the present process is that the lead dioxide or other curing agent can be omitted from the priming mixture, which results in making the priming mixture stable at room temperature, and much easier to handle. The curing agent must be added to the "Thiokol"-filler cement mixture shortly before use, as known to those skilled in the use of liquid "Thiokol" adhesives. Simple equipment for assembling the laminates in the field is readily available. The "Kel-F" sheeting or "Teflon" sheeting (polytetrafluoroethylene), factory primed, can be readily applied to the other member of the laminate in the field owing to the fact that only light pressure is needed for pressing the two laminate parts together, and the fact that the cement between the parts will cure at a relatively low temperature after standing for about one day. Where "Teflon" sheeting is used the priming mixture applied to the sheeting contains fine particles of "Teflon," as described in the Panagrossi and Hauser application above mentioned.

The polyalkylene polysulfide may, if desired, be used with fillers other than those described above, and variations may be made in the formulation of the adhesive mixtures as required by different conditions.

The technique I have described can be applied to a variety of materials in addition to aluminum and glass. These are described in the examples given since they are difficult to cement. The same method applies equally well to other metals, to wood and to glass and ceramic articles.

What I claim is:

1. The method of bonding a sheet of high-molecular-weight fluorocarbon polymer to another material, which comprises forming an intimate mixture of finely divided fluorocarbon polymer and finely divided polyalkylene polysulfide rubber on a surface of the sheet, fusing it thereon to provide on the sheet a composite priming coating, and then adhesively securing the sheet to the other material by the use of a cement applied to the other material and to said priming coating, said cement containing uncured polyalkylene polysulfide rubber, and letting the resulting assembly stand for about 24 hours at room temperature to accomplish the curing of the rubber in the cement.

2. The method of making a laminate of high-molecular-weight fluorocarbon polymer and another material, which comprises applying particles of the said polymer and particles of polyalkylene polysulfide rubber to the surface of a sheet of said polymer to provide a composite layer, fusing this layer to the sheet to provide an adhering adhesive priming coating, applying to a surface of the other material a coating of an adhesive containing uncured polyalkylene polysulfide rubber, applying the priming coating on the polymer to the last-mentioned coating and exerting light pressure to join the polymer sheet to the other material, and permitting the resulting composite structure to stand for a period at room temperature in order to cure the polyalkylene polysulfide rubber between the layers.

3. The method of making a laminate of a sheet of high-molecular-weight fluorocarbon polymer and a sheet of another material, which comprises placing on the first sheet particles of the said polymer and particles of uncured polyalkylene polysulfide rubber, heating the sheet so as to form thereon from said particles a strongly adherent composite priming layer, applying to a surface of the other sheet a cement coating containing uncured polyalkylene polysulfide rubber, assembling the layers so as to apply the last-named coating to the priming layer on the fluorocarbon sheet, exerting light pressure to condense the laminate, and then letting the composite structure stand for about 24 hours in order to cure the polyalkylene polysulfide rubber cement.

4. The method of making a laminate of high-molecular-weight fluorocarbon polymer and another material, which comprises applying to the surface of a sheet of said polymer a composite layer containing particles of the said polymer, particles of polyalkylene polysulfide rubber, a filler, and a curing agent, fusing this layer to the sheet to provide an adhering adhesive priming coating, applying to the surface of the other material a coating of an adhesive containing uncured polyalkylene polysulfide rubber, a filler, and a curing agent, applying the priming coating on the polymer to the last-mentioned coating and exerting light pressure to join the polymer sheet to the other material, and permitting the resulting composite structure to stand for a period at room temperature in order to cure the polyalkylene polysulfide rubber between the layers.

5. The method of making a laminate of high-molecular-weight fluorocarbon polyer and another material, which comprises applying to the surface of a sheet of said polymer a composite layer containing in the absence of a curing agent a mixture of particles of the polymer, particles of polyalkylene polysulfide rubber and a pigmented filler, fusing this layer to the sheet an adhering adhesive priming coating, applying to the surface of the other material a coating of an adhesive containing uncured polyalkylene polysulfide rubber, a filler, and a curing agent, applying the priming coating on the polymer to the last-mentioned coating and exerting light pressure to join the polymer sheet to the other material, and curing the said coating by exposing it to air at room temperature.

6. A laminate of high-molecular-weight fluorocarbon polymer and another material, the fluorocarbon layer having on one surface a strongly adherent fused coating of particles of the same fluorocarbon polymer and particles of polyalkylene polysulfide rubber, and the layer of the other material being bonded to said coating by a layer of cured cement containing polyalkylene polysulfide rubber.

7. A receptacle having an inner coating of a cured cement containing polyalkylene polysulfide rubber, and a liner of high-molecular-weight fluorocarbon polymer in said receptacle having a priming surface containing particles of said polymer and particles of polyalkylene polysulfide rubber, said priming surface being directly adhered and bonded to said cement.

References Cited in the file of this patent

UNITED STATES PATENTS

| | | |
|---|---|---|
| 2,049,974 | Patrick | Aug. 4, 1936 |
| 2,469,141 | Alexander | May 3, 1949 |
| 2,484,484 | Berry | Oct. 11, 1949 |
| 2,539,329 | Sanders | Jan. 23, 1951 |

FOREIGN PATENTS

| | | |
|---|---|---|
| 660,398 | Great Britain | Mar. 28, 1949 |

OTHER REFERENCES

Modern Plastics, October 1948, pages 168, 170, 172.